Figure 1:
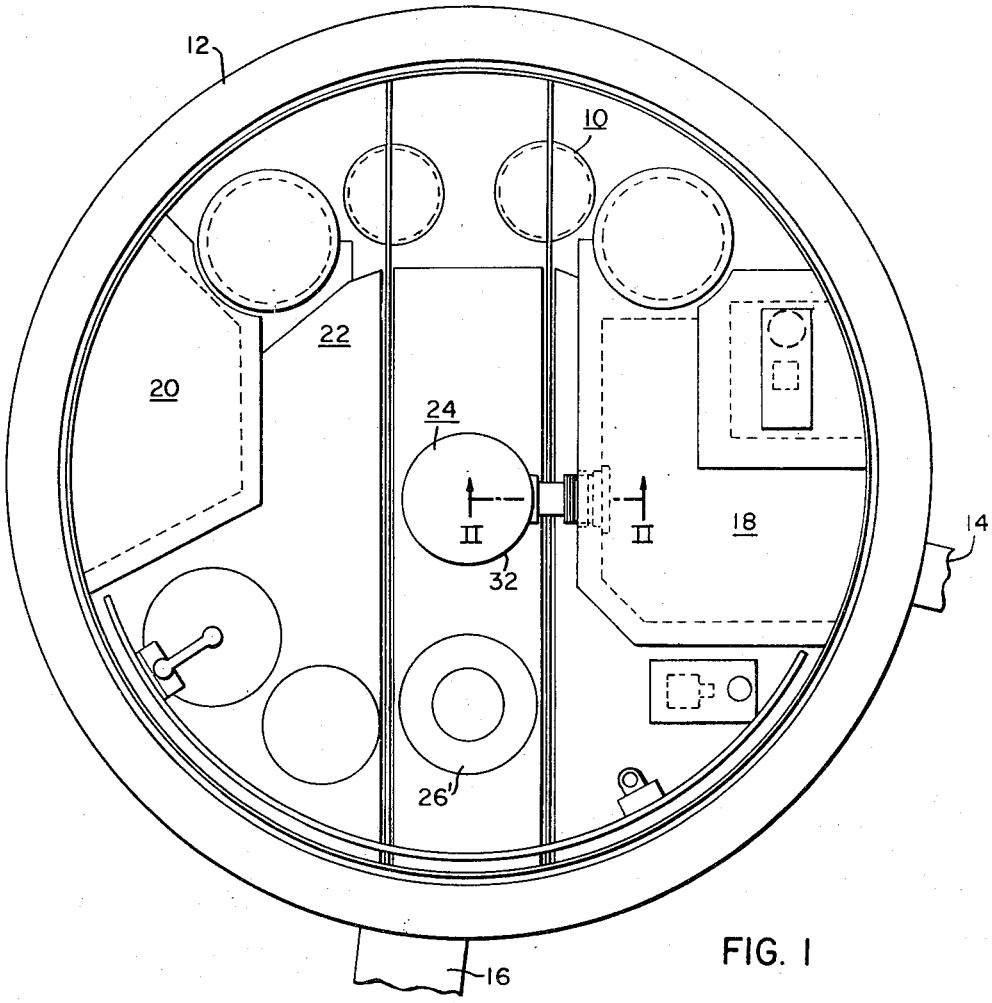
Figure 2:
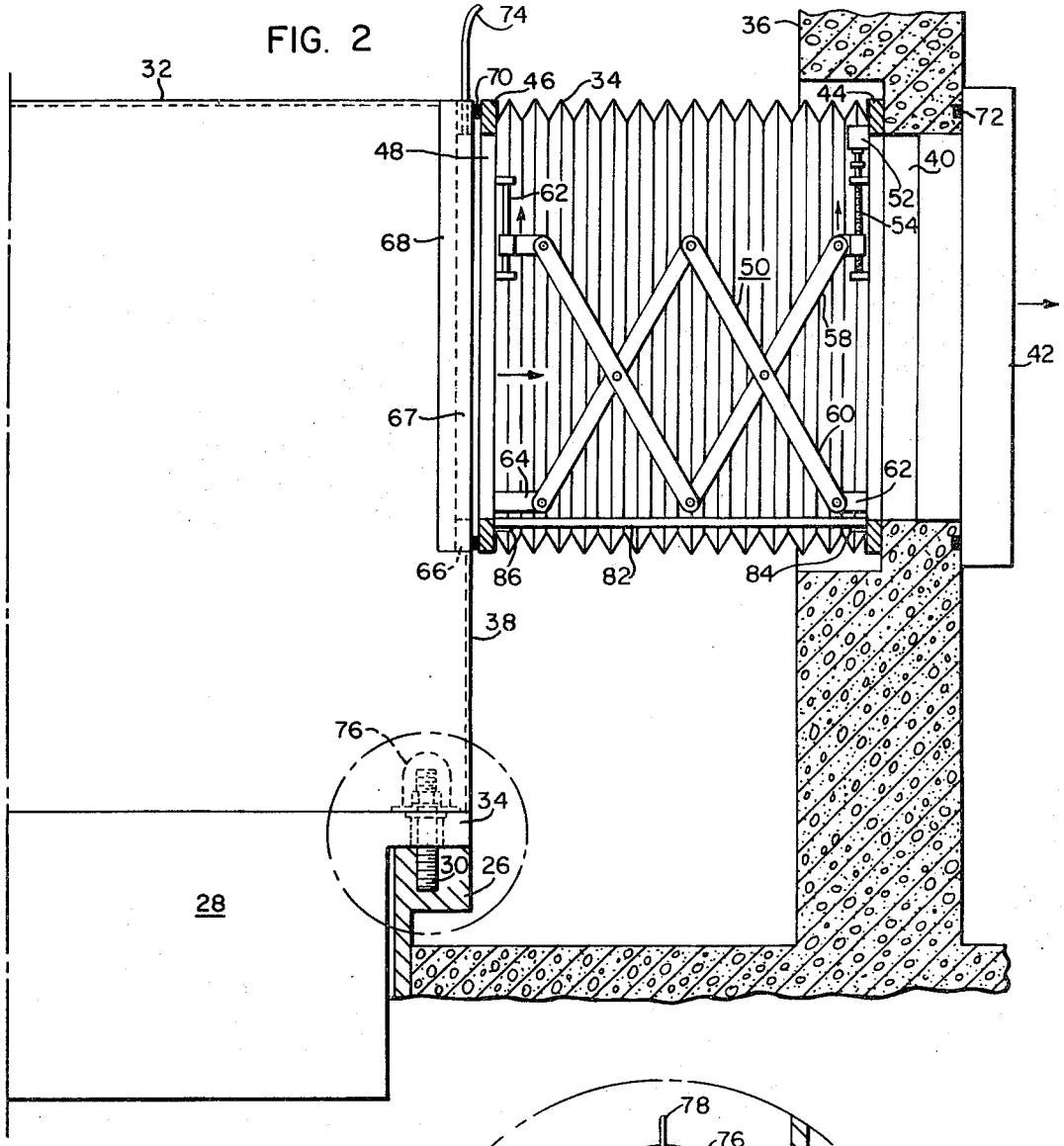
Figure 3:
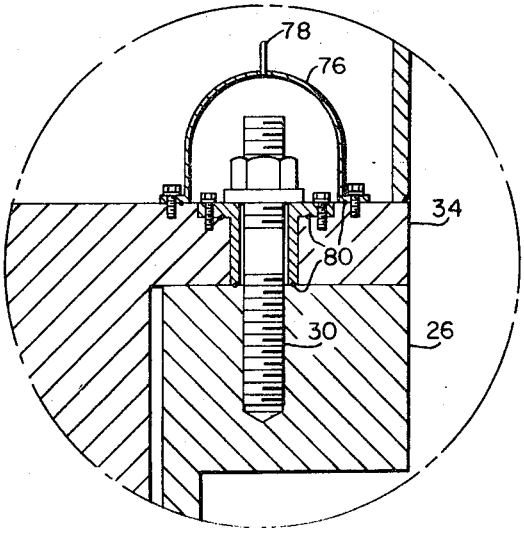

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 778

T901,028
SHIELD PLUG ACCESS ENCLOSURE FOR A NUCLEAR REACTOR

John D. Sutherland, Monroeville, Pa., assignor to Westinghouse Electric Corporation, Pittsburgh, Pa.

Filed Feb. 11, 1971, Ser. No. 114,629
Int. Cl. G21c *19/20*
U.S. Cl. 176—27
2 Sheets Drawing. 9 Pages Specification

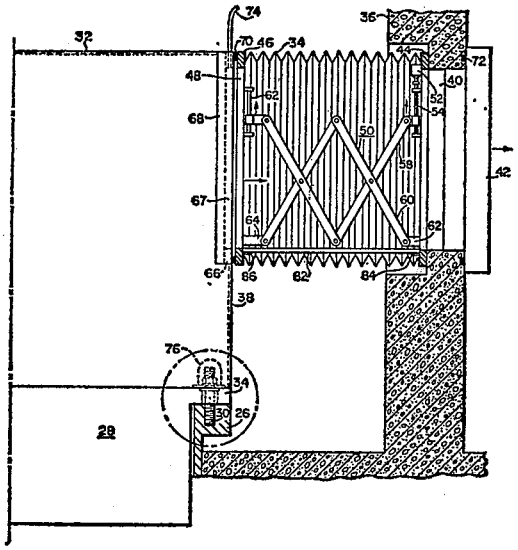

The shield plug of a liquid metal cooled fast breeder reactor which uses a hot cell refueling system has a metal access enclosure sealed to its upper surface. The enclosure contains the control rod drive mechanisms, reactor closure bolts and other components as are generally mounted on a shield plug, and an air atmosphere is provided within the enclosure. A horizontal extending bellows-like structure allows personnel access to the enclosure from the exterior of the hot cell.

SHIELD PLUG ACCESS ENCLOSURE FOR A NUCLEAR REACTOR

Filed Feb. 11, 1971 2 Sheets-Sheet 1

SHIELD PLUG ACCESS ENCLOSURE FOR A NUCLEAR REACTOR

Filed Feb. 11, 1971 2 Sheets-Sheet 2